United States Patent
Lee (10) Patent No.: US 9,479,293 B2
(45) Date of Patent: Oct. 25, 2016

(54) METHOD OF HANDLING HARQ FEEDBACKS AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/321,842

(22) Filed: Jul. 2, 2014

(65) Prior Publication Data

US 2015/0016351 A1 Jan. 15, 2015

Related U.S. Application Data

(60) Provisional application No. 61/844,521, filed on Jul. 10, 2013.

(51) Int. Cl.
| | | |
|---|---|---|
| *H04W 4/00* | (2009.01) | |
| *H04L 1/16* | (2006.01) | |
| *H04L 5/00* | (2006.01) | |
| *H04L 1/18* | (2006.01) | |
| *H04L 1/00* | (2006.01) | |

(52) U.S. Cl.
CPC .......... *H04L 1/1671* (2013.01); *H04L 1/1861* (2013.01); *H04L 5/0032* (2013.01); *H04L 5/0053* (2013.01); *H04L 5/0055* (2013.01); *H04L 1/1607* (2013.01); *H04L 1/1812* (2013.01); *H04L 1/1854* (2013.01); *H04L 1/1887* (2013.01); *H04L 2001/0093* (2013.01)

(58) Field of Classification Search
CPC . H04L 1/1671; H04L 5/0053; H04L 5/0032; H04L 5/0055; H04L 1/1861; H04L 1/1854; H04L 1/1887; H04L 1/1607
See application file for complete search history.

(56) References Cited

U.S. PATENT DOCUMENTS

| | | | | |
|---|---|---|---|---|
| 2011/0110246 A1* | 5/2011 | Damnjanovic | ....... | H04L 1/0028 370/252 |
| 2011/0116455 A1* | 5/2011 | Damnjanovic | ....... | H04L 1/0028 370/329 |
| 2011/0199975 A1 | 8/2011 | Wu | | |
| 2011/0243066 A1* | 10/2011 | Nayeb Nazar | .......... | H04L 1/007 370/328 |
| 2012/0113831 A1* | 5/2012 | Pelletier | ................ | H04L 5/0058 370/252 |
| 2012/0176978 A1 | 7/2012 | Kim | | |

(Continued)

FOREIGN PATENT DOCUMENTS

| | | |
|---|---|---|
| TW | 201004209 | 1/2010 |
| TW | 201316732 | 4/2013 |

(Continued)

*Primary Examiner* — Jay P Patel
(74) *Attorney, Agent, or Firm* — Winston Hsu; Scott Margo (57) ABSTRACT

A method of transmitting hybrid automatic repeat request (HARQ) feedbacks for a communication device comprises transmitting at least one first HARQ feedback to a first base station according to first downlink (DL) control information (DCI) indicating at least one first DL packet, if the at least one first HARQ feedback is at least triggered by the at least one first DL packet, wherein the at least one first DL packet is transmitted by the first base station to the communication device; and transmitting at least one second HARQ feedback to the first base station, if the at least one second HARQ feedback is only triggered by at least one second DL packet, wherein the at least one second DL packet is transmitted by a second base station to the communication device.

19 Claims, 5 Drawing Sheets

(56) References Cited

U.S. PATENT DOCUMENTS

| | | |
|---|---|---|
| 2013/0114524 A1 | 5/2013 | Sirotkin |
| 2013/0242814 A1 | 9/2013 | Wang |
| 2014/0056278 A1* | 2/2014 | Marinier ............. H04W 72/044 370/330 |
| 2014/0177539 A1* | 6/2014 | Novak .................. H04W 72/04 370/329 |
| 2014/0192740 A1 | 7/2014 | Ekpenyong |
| 2014/0321406 A1* | 10/2014 | Marinier ................ H04B 7/024 370/329 |
| 2015/0043394 A1* | 2/2015 | Lin ....................... H04L 1/1861 370/280 |
| 2015/0249980 A1 | 9/2015 | You |

FOREIGN PATENT DOCUMENTS

| | | |
|---|---|---|
| TW | 201320676 | 5/2013 |
| WO | 2010082720 A1 | 7/2010 |
| WO | 2011041623 A1 | 4/2011 |
| WO | 2011055238 A1 | 5/2011 |
| WO | 2013022751 A1 | 2/2013 |

* cited by examiner

METHOD OF HANDLING HARQ FEEDBACKS AND RELATED COMMUNICATION DEVICE

CROSS REFERENCE TO RELATED APPLICATIONS

This application claims the benefit of U.S. Provisional Application No. 61/844,521, filed on Jul. 10, 2013 and incorporated herein by reference.

BACKGROUND OF THE INVENTION

1. Field of the Invention

The present invention relates to a method used in a wireless communication system and related communication device, and more particularly, to a method of handling hybrid automatic repeat request (HARQ) feedbacks in a wireless communication system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The UE may receive packets (e.g., transport blocks (TBs)) transmitted by two eNBs, e.g., NB1-NB2, when the UE is configured with dual connectivity. The UE needs to transmit hybrid automatic repeat request (HARQ) feedbacks corresponding to the packets to the eNBs NB1-NB2, to acknowledge the reception of the packets. For example, the UE may transmit the HARQ feedbacks to the eNB NB1, and the HARQ feedbacks corresponding to the packets transmitted by the eNB NB2 may be forwarded by the eNB NB1 to the eNB NB2. However, a backhaul (e.g., X2 interface) connected between the eNBs NB1-NB2 may not be ideal, e.g., a delay caused by the backhaul to a transmission on the backhaul is large. In addition, resource for transmitting the HARQ feedbacks may depend on resource information which is only available at the eNB NB2. Thus, the eNB NB1 may not be able to transmit the HARQ feedbacks to the eNB NB2 via backhaul correctly, and the eNB NB2 may not operate regularly due to the delayed HARQ feedbacks. For example, the eNB NB2 may determine that the packets are not received correctly by the UE, and the eNB NB2 retransmits the packets to the UE. In this situation, not only throughput of the UE is degraded, but the UE cannot operate regularly due to wrong retransmissions of the packets.

Thus, it is important to mitigate or even eliminate the effect of the non-ideal backhaul between the eNBs, for the eNBs to receive the HARQ feedbacks immediately.

SUMMARY OF THE INVENTION

The present invention therefore provides a method and related communication device for handling HARQ feedbacks to solve the abovementioned problem.

A method of transmitting hybrid automatic repeat request (HARQ) feedbacks for a communication device comprises transmitting at least one first HARQ feedback to a first base station according to first downlink (DL) control information (DCI) indicating at least one first DL packet, if the at least one first HARQ feedback is at least triggered by the at least one first DL packet, wherein the at least one first DL packet is transmitted by the first base station to the communication device; and transmitting at least one second HARQ feedback to the first base station, if the at least one second HARQ feedback is only triggered by at least one second DL packet, wherein the at least one second DL packet is transmitted by a second base station to the communication device.

A method of transmitting HARQ feedbacks for a communication device the method comprises transmitting at least one first HARQ feedback to a first base station according to a first PUCCH format, if the at least one first HARQ feedback is at least triggered by the at least one first DL packet, wherein the at least one first DL packet is transmitted by the first base station to the communication device; and transmitting at least one second HARQ feedback to the first base station according to a second PUCCH format, if the at least one second HARQ feedback is only triggered by the at least one second DL packet, wherein the at least one second DL packet is transmitted by a second base station to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
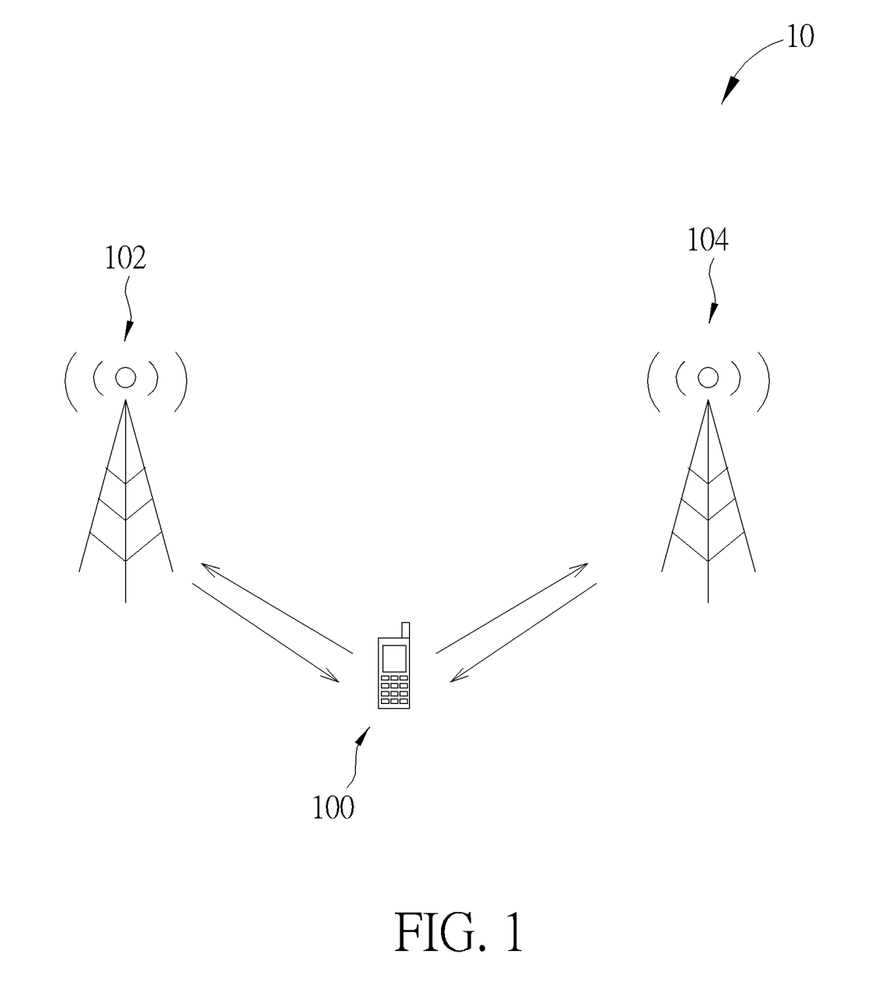
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100 and base stations (BSs) 102 and 104. In FIG. 1, the UE 100, the BSs 102 and 104 and are simply utilized for illustrating the structure of the wireless communication system 10. Practically, the BS 102 and/or the BS 104 may be an evolved NB (eNB) and/or a relay station in an evolved UTRAN (E-UTRAN), a long term evolution (LTE) system, a LTE-Advanced (LTE-A) system or an evolution of the LTE-A system. The wireless communication system 10 may be a time-division duplexing (TDD) system (i.e., the TDD is operated) or a frequency-division duplexing (FDD) system (i.e., the FDD is operated). In FIG. 1, coverage areas of the BS 102 and the BS 104 may be partly overlapped.

As shown in FIG. 1, the UE 100 may communicate with the BS 102 and the BS 104 at the same time according to a dual connectivity configured to the UE 100. That is, the UE 100 may perform a transmission/reception via both the BSs 102 and 104. For example, the UE 100 may receive packets (e.g., transport blocks (TBS)) from the BSs 102 and 104 according to the dual connectivity, or the UE 100 may transmit packets (e.g., TBs) to the BSs 102 and 104 according to the dual connectivity. In general, it means that the UE 100 receives the packets from at least one cell of the BS 102 and at least one cell of the BS 104 according to the dual connectivity, when the UE 100 receives the packets from both the BSs 102 and 104. Similarly, it means that the UE 100 transmits the packets to at least one cell of the BS 102 and/or at least one cell of the BS 104 according to the dual connectivity, when the UE 100 transmits the packets to both the BSs 102 and 104. In addition, one of the cells communicating with the UE 100 may be a primary cell (e.g., UL carrier for transmitting hybrid automatic repeat request (HARQ)), and the other cell(s) may be secondary cell(s).

The UE 100 may be a machine type communication (MTC) device, a mobile phone, a laptop, a tablet computer, an electronic book or a portable computer system. In addition, the UE 100, the BS 102 or the BS 104 may be seen as a transmitter or a receiver according to its transmission direction, e.g., for an uplink (UL), the UE 100 is the transmitter and the BS 102 and/or the BS 104 is the receiver, and for a downlink (DL), the BS 102 and/or the BS 104 is the transmitter and the UE 100 is the receiver.

Figure 2:
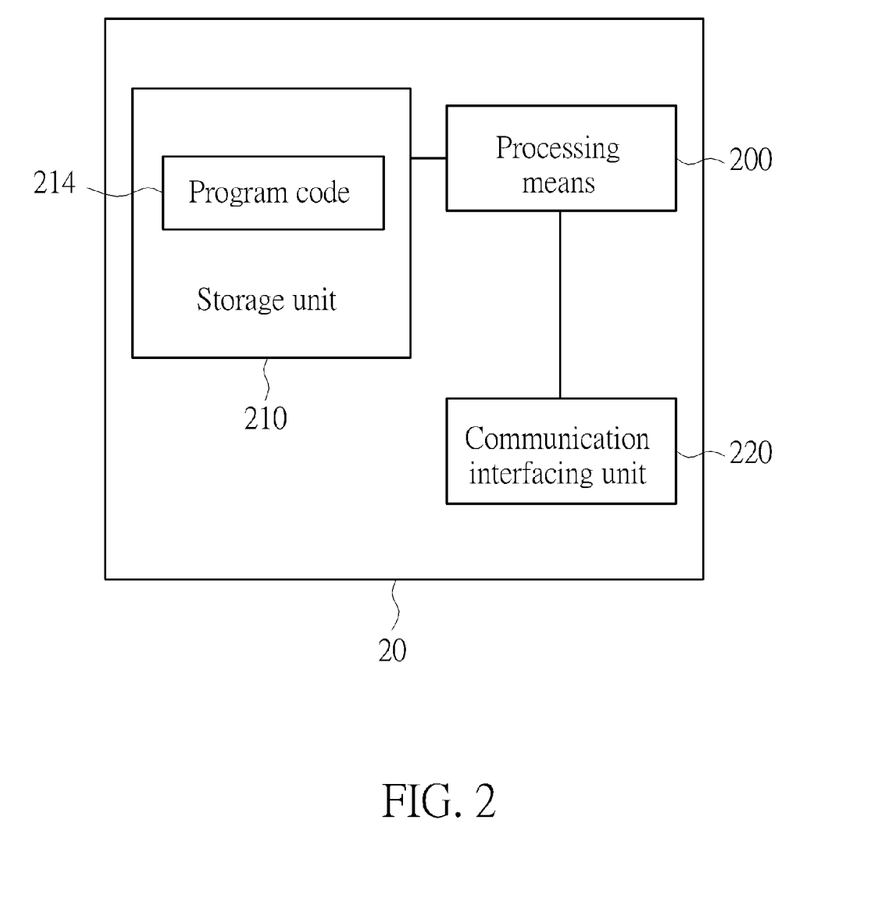
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., data, signals, messages and/or packets) according to processing results of the processing means 200.

Figure 3:
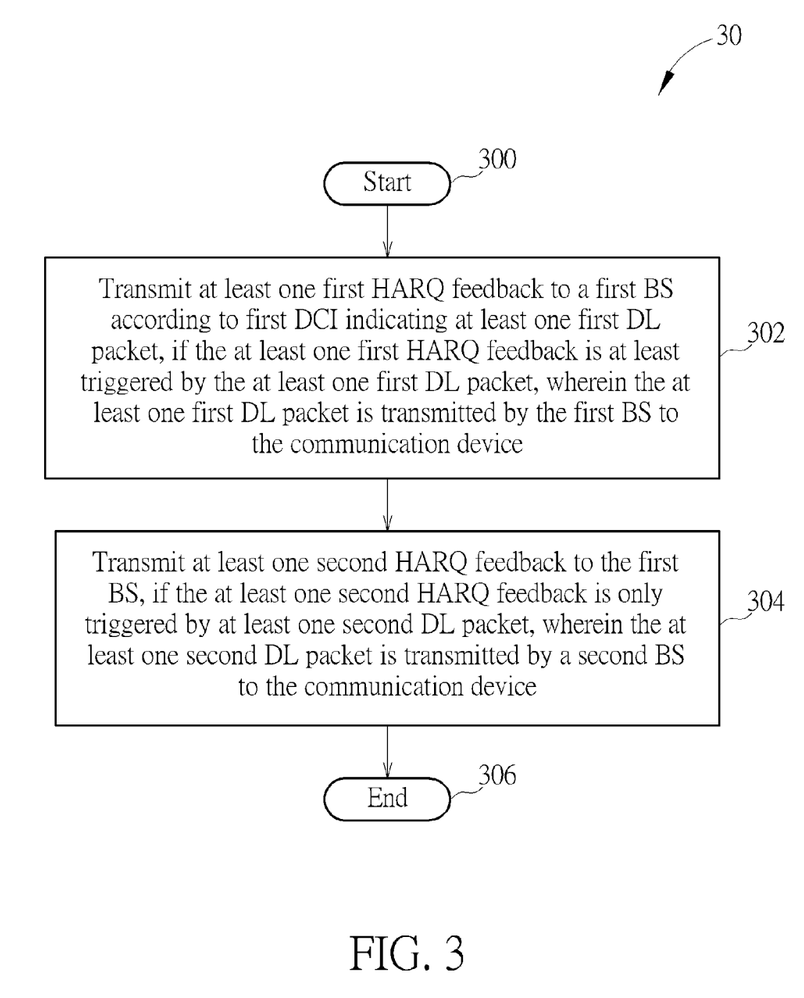
FIG. 3 is a flowchart of a process according to an example of the present invention.

FIG. 3 is a flowchart of a process 30 according to an example of the present invention. The process 30 may be utilized in a communication device, for transmitting HARQ feedbacks. The process 30 may be compiled into the program code 214 and includes the following steps:

Step 300: Start.

Step 302: Transmit at least one first HARQ feedback to a first BS according to first DCI indicating at least one first DL packet, if the at least one first HARQ feedback is at least triggered by the at least one first DL packet, wherein the at least one first DL packet is transmitted by the first BS to the communication device.

Step 304: Transmit at least one second HARQ feedback to the first BS, if the at least one second HARQ feedback is only triggered by at least one second DL packet, wherein the at least one second DL packet is transmitted by a second BS to the communication device.

Step 306: End.

According to the process 30, the communication device (e.g., the UE 100) transmits at least one first HARQ feedback to a first BS (e.g., the BS 102) according to first DL control information (DCI) indicating at least one first DL packet, if the at least one first HARQ feedback is at least triggered by the at least one first DL packet, wherein the at least one first DL packet is transmitted by the first BS to the communication device. In addition, the communication device transmits at least one second HARQ feedback to the first BS, if the at least one second HARQ feedback is only triggered by at least one second DL packet, wherein the at least one second DL packet is transmitted by a second BS (e.g., the BS 104) to the communication device. In addition, a primary cell of the communication device may be controlled by the first BS. In general, the HARQ feedback(s) is transmitted on a physical UL control channel (PUCCH) via the primary cell to the first BS. According to the behavior of the communication device, the communication device may be configured to transmit the at least one first HARQ feedback or the at least one second HARQ feedback according to a PUCCH format 1a or 1b. For example, the communication device may use the PUCCH format 1a or 1b for transmitting the HARQ feedback(s), if the communication device is configured with the PUCCH format 1b with channel selection (e.g., configured with the dual connectivity).

In other words, an example of the first scenario (step 302) may be that the at least one first HARQ feedback is triggered only by the at least one first DL packet. Another example of the first scenario may be that a first set of the at least one first HARQ feedback is triggered by the at least one first DL packet and a second set of the at least one first HARQ feedback is triggered by at least one third DL packet transmitted by the second BS. In both examples, the communication device transmits the HARQ feedback(s) according to the first DCI which indicates the DL packet(s) transmitted by the first BS. In the second scenario (step 304), the communication device transmits the HARQ feedback(s), if the HARQ feedback(s) is triggered by the DL packet(s) transmitted only by the second BS.

It is possible that the at least one first HARQ feedback in the process 30 is at least triggered by the at least one first DL packet and at least one third DL packet, wherein the at least one third DL packet is also transmitted by the first BS to the communication device, e.g., when the TDD is operated by the communication device. In this situation, the first scenario can be realized by that the communication device transmits the at least one first HARQ feedback according to the first DCI and second DCI, wherein the second DCI indicates the at least one third DL packet. Thus, the examples illustrated below can readily be extended to the case where the TDD is operated by the communication device, e.g., the TDD system.

Thus, the first BS can easily detect (e.g., recognize, receive, decode and/or demodulate) the HARQ feedback(s) transmitted by the communication device according to resource regions where the HARQ feedback(s) locates. For example, in the first scenario (step 302), the first BS may detect the HARQ feedback(s) by itself, because the HARQ feedback(s) will locate in a first resource region according to the first DCI. In the second scenario (step 304), the first BS may simply forward the HARQ feedback (s) to the second BS, because the HARQ feedback (s) will locate in a second resource region reserved for the second BS and the HARQ feedback (s) is not triggered by any packet transmitted by the first BS. It should be noted that the communication device may not know the existence of the resource regions which are preferably used (e.g., scheduled) by the first BS. The problem in the art that the first BS cannot provide the HARQ feedback (s) to the second BS immediately is solved. In addition, the problem that resource index which is used for determining resources for transmitting the HARQ feedback (s) cannot be synchronized between the first BS and the second BS is solved.

Realization of the present invention is not limited to the above description.

The at least one first HARQ feedback in the process 30 may be transmitted to the first BS according to a function of a location of the first DCI indicating the at least one first DL packet. For example, let $n_{DCI}$ be the location of the first DCI. For example, $n_{DCI}$ may be the number of the first control channel element (CCE) (i.e., lowest CCE index used to construct the corresponding DCI) that is transmitted in the physical DL control channel (PDCCH), or may be the number of the first eCCE (i.e., the lowest enhanced CCE (eCCE) index used to construct the corresponding enhanced DCI (eDCI)) that is transmitted in the enhanced PDCCH (ePDCCH). Considering that the communication device prepares to transmit 4 HARQ feedbacks to the first BS, wherein two of the HARQ feedbacks are triggered by DL packets transmitted by the first BS and the other HARQ feedbacks are triggered by DL packets transmitted by the second BS, the communication device may transmit the HARQ feedbacks in PUCCH resources (e.g., in the first resource region which may not be known by the communication device). The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)} = f(n_{DCI})$, $n_{PUCCH,1}^{(1)} = f(n_{DCI}) + i$, $n_{PUCCH,2}^{(1)} = f(n_{DCI}) = j$, $n_{PUCCH,3}^{(1)} = f(n_{DCI}) + k$, $f(\cdot)$ is a function, and i, j, k may be predetermined values. For example, a PUCCH resource may be determined for the Table 10.1.2.2.1-5 of 3GPP TS 36.213 v11.3.0, for transmitting the at least one HARQ feedback. In other words, a method for determining the $n_{PUCCH,x}^{(1)}$ is provided in the present invention, and can be applied to the case of the PUCCH format 1b with channel selection. The above example can be applied to the communication device operating the TDD or the FDD.

Another example for the communication device operating the TDD is illustrated as follows. Let $n_{DCI,0}$ and $n_{DCI,1}$ be the locations of first DCI and second DCI, respectively, which both indicate DL packets transmitted by the first BS. Considering that the communication device prepares to transmit 4 HARQ feedbacks to the first BS, wherein two of the HARQ feedbacks may be triggered by DL packets transmitted by the first BS and the other HARQ feedbacks may be triggered by DL packets transmitted by the second BS, the communication device may transmit the HARQ feedbacks in PUCCH resources (e.g., in the first resource region which may not be known by the communication device). The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)} = f(n_{DCI,0})$, $n_{PUCCH,1}^{(1)} = f(n_{DCI,0}) + i$, $n_{PUCCH,2}^{(1)} = f(n_{DCI,1})$, $n_{PUCCH,3}^{(1)} = f(n_{DCI,1}) + i$, $f(\cdot)$ is a function, and i may be a predetermined value.

The at least one first HARQ feedback in the process 30 may be transmitted to the first BS according to an indication in the first DCI and a function of a location of the first DCI indicating the at least one first DL packet. For example, let $n_{DCI}$ be the location of the first DCI. For example, $n_{DCI}$ may be the number of the first CCE (i.e., the lowest CCE index used to construct the corresponding DCI) that is transmitted in the PDCCH, or may be the number of the first eCCE (i.e., the lowest eCCE index used to construct the corresponding eDCI) that is transmitted in the ePDCCH. Considering that the communication device prepares to transmit 4 HARQ feedbacks to the first BS, wherein two of the HARQ feedbacks are triggered by DL packets transmitted by the first BS and the other HARQ feedbacks are triggered by DL packets transmitted by the second BS, the communication device may transmit the HARQ feedbacks in PUCCH resources (e.g., in the first resource region which may not be known by the communication device). The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)} = f(n_{DCI})$, $n_{PUCCH,1}^{(1)} = f(n_{DCI}) + i$, $f(\cdot)$ is the function, and i may be a predetermined value. Similarly, a PUCCH resource may be determined to the Table 10.1.2.2.1-5 of 3GPP TS 36.213 v11.3.0, for transmitting the at least one HARQ feedback. In other words, a method for determining $n_{PUCCH,x}^{(1)}$ is provided in the present invention, and can be applied to the case of the PUCCH format 1b with channel selection. $n_{PUCCH,2}^{(1)}$ and $n_{PUCCH,3}^{(1)}$ are determined according to the indication in the first DCI. In another example, $n_{PUCCH,0}^{(1)}$, $n_{PUCCH,1}^{(1)}$, $n_{PUCCH,2}^{(1)}$ and $n_{PUCCH,3}^{(1)}$ are determined according to the indication in the first DCI. Preferably, the indication may be in a transmit power control (TPC) field of the first DCI, and is not limited herein. The above example can be applied to the communication device operating the TDD or the FDD.

Another example for the communication device operating the TDD is illustrated as follows. Let $n_{DCI,0}$ and $n_{DCI,1}$ be the locations of first DCI and second DCI, respectively, which both indicate DL packets transmitted by the first BS. Considering that the communication device prepares to transmit 4 HARQ feedbacks to the first BS, wherein two of the HARQ feedbacks may be triggered by DL packets transmitted by the first BS and the other HARQ feedbacks may be triggered by DL packets transmitted by the second BS, the communication device may transmit the HARQ feedbacks in PUCCH resources (e.g., in the first resource region which may not be known by the communication device). The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)} = f(n_{DCI,0})$, $n_{PUCCH,1}^{(1)} = f(n_{DCI,0}) + i$, $f(\cdot)$ is a function, and i may be a predetermined value. $n_{PUCCH,2}^{(1)}$ and $n_{PUCCH,3}^{(1)}$ may be determined according to an indication in the second DCI.

The at least one second HARQ feedback in the process 30 may be transmitted to the first BS according to second DCI indicating the at least one second DL packet. For example, let $n_{DCI}$ be the location of the second DCI. For example, $n_{DCI}$ may be the number of the first CCE (i.e., the lowest CCE index used to construct the corresponding DCI) that is transmitted in the PDCCH, or may be the number of the first eCCE (i.e., the lowest eCCE index used to construct the corresponding eDCI) that is transmitted in the ePDCCH. Considering that the communication device prepares to transmit 4 HARQ feedbacks to the first BS, wherein all of the HARQ feedbacks are triggered by DL packets transmitted by the second BS, the communication device may transmit the HARQ feedbacks in PUCCH resources (e.g., in the second resource region which may not be known by the communication device, and the second resource region is different from the first resource region used in the first scenario). The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)}=g(n_{DCI})$, $n_{PUCCH,1}^{(1)}=g(n_{DCI})+i$, $n_{PUCCH,2}^{(1)}=g(n_{DCI})+j$, $n_{PUCCH,3}^{(1)}=g(n_{DCI})+k$, $g(\cdot)$ is a function, and i, j, k may be predetermined values. Similarly, a PUCCH resource may be determined to the Table 10.1.2.2.1-5 of 3GPP TS 36.213 v11.3.0, for transmitting the at least one HARQ feedback. In other words, a method for determining $n_{PUCCH,x}^{(1)}$ is provided in the present invention, and can be applied to the case of the PUCCH format 1b with channel selection. The above example can be applied to the communication device operating the TDD or the FDD. Another example for the communication device operating the TDD can be obtained by replacing the function f in the previous example by the function g, and is not narrated herein.

The at least one second HARQ feedback in the process 30 may be transmitted to the first BS according to a higher layer configuration. For example, the higher layer configuration may be configured by a higher layer signaling, e.g., medium access control (MAC) signaling, radio resource control (RRC) signaling. In one example, the higher layer configuration may be predetermined, e.g., a group of PUCCH resources which may include $n_{PUCCH,0}^{(1)}$, $n_{PUCCH,1}^{(1)}$, $n_{PUCCH,2}^{(1)}$ and $n_{PUCCH,3}^{(1)}$ may be used for transmitting the at least one second HARQ feedback. That is, the group of PUCCH resources may be determined in the higher layer configuration. Then, one of the group of PUCCH resources, e.g., $n_{PUCCH,1}^{(1)}$, is selected by a physical layer signaling. For example, the physical layer signaling may be TPC, ARO or new field in the PDCCH.

On the other hand, in the first scenario (step 302), the communication device may transmit the at least one first HARQ feedback by transmitting a first bit representing a first set of the at least one first HARQ feedback and a second bit representing a second set of the at least one first HARQ feedback. The first set of the at least one first HARQ feedback is triggered by the at least one first DL packet, and the second set of the at least one first HARQ feedback is triggered by at least one third DL packet transmitted by the second BS. In other words, the HARQ feedbacks to be transmitted are compressed, and are represented by only two bits, to reduce the overhead. For example, the first bit may be "1" with PUCCH format 1b (or PUCCH format 3) if all the at least one first DL packet is correctly received by the communication device (e.g., logical "AND" is used); otherwise, the first bit may be "0". Similarly, the second bit may be "1" with PUCCH format 1b (or PUCCH format 3) if all the at least one third DL packet is correctly received by the communication device (e.g., logical "AND" is used); otherwise, the second bit may be "0".

On the other hand, in the second scenario (step 304), the communication device may transmit the at least one second HARQ feedback by transmitting a bit representing the at least one second HARQ feedback. In other words, the HARQ feedbacks to be transmitted are compressed, and are represented by only one bit, to reduce the overhead. For example, the bit may be "1" with PUCCH format 1a (or PUCCH format 3) if all the at least one second DL packet is correctly received by the communication device (e.g., logical "AND" is used); otherwise, the bit may be "0".

Figure 4:
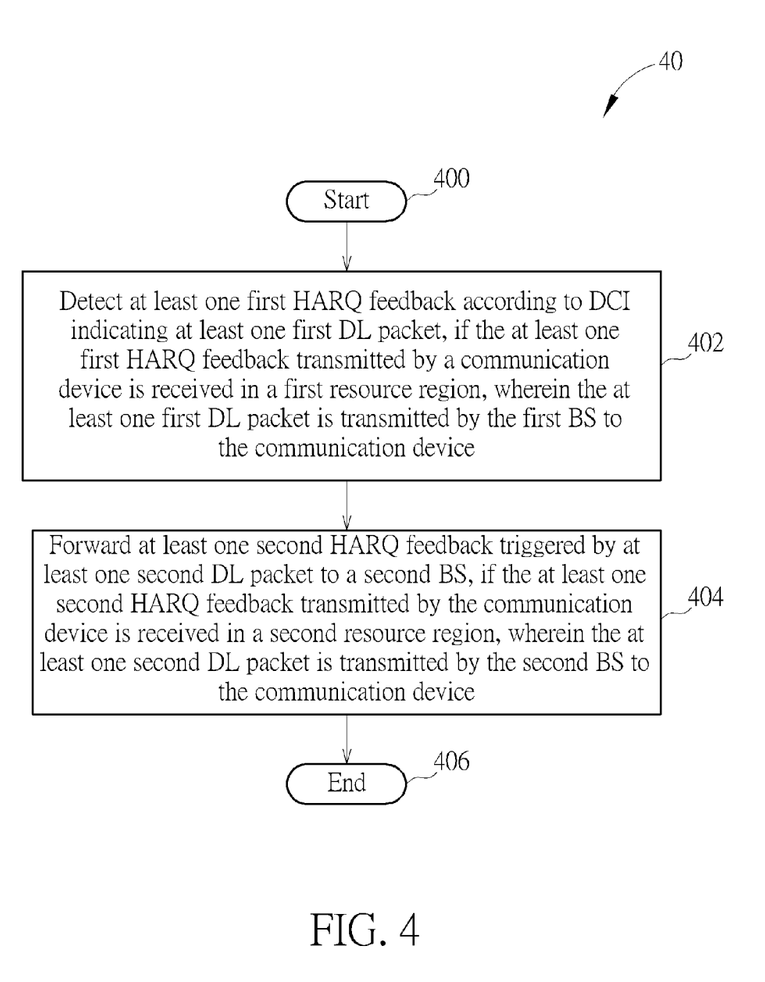
FIG. 4 is a flowchart of a process according to an example of the present invention.

Correspondingly, FIG. 4 is a flowchart of a process 40 according to an example of the present invention. The process 40 may be utilized in a first BS (e.g., the BS 102), for receiving HARQ feedbacks transmitted by the communication device realizing the process 30. The process 40 may be compiled into the program code 214 and includes the following steps:

Step 400: Start.

Step 402: Detect at least one first HARQ feedback according to DCI indicating at least one first DL packet, if the at least one first HARQ feedback transmitted by a communication device is received in a first resource region, wherein the at least one first DL packet is transmitted by the first BS to the communication device.

Step 404: Forward at least one second HARQ feedback triggered by at least one second DL packet to a second BS, if the at least one second HARQ feedback transmitted by the communication device is received in a second resource region, wherein the at least one second DL packet is transmitted by the second BS to the communication device.

Step 406: End.

According to the process 40, the first BS detects (e.g., recognizes, receives, decodes and/or demodulates) at least one first HARQ feedback according to DCI indicating at least one first DL packet, if the at least one first HARQ feedback transmitted by a communication device (e.g., the UE 100) is received in a first resource region, wherein the at least one first DL packet is transmitted by the first BS to the communication device. In addition, the first BS forwards at least one second HARQ feedback triggered by at least one second DL packet to a second BS (e.g., the BS 104), if the at least one second HARQ feedback transmitted by the communication device is received in a second resource region, wherein the at least one second DL packet is transmitted by the second BS to the communication device. Preferably, the resource regions are non-overlapped PUCCH partitions or partly-overlapped PUCCH partitions, and is not limited herein. In addition, a primary cell of the communication device may be controlled by the first BS. According to the behavior of the communication device, the communication device may be configured to transmit the at least one first HARQ feedback or the at least one second HARQ feedback according to a PUCCH format 1a or 1b. For example, the communication device may use the PUCCH format 1a or 1b for transmitting the HARQ feedback(s), if the communication device is configured with the PUCCH format 1b with channel selection (e.g., configured with the dual connectivity).

In other words, an example of the first scenario (step 402) where the first resource region is used may be that the at least one first HARQ feedback is triggered only by the at least one first DL packet. Another example of the first scenario is that a first set of the at least one first HARQ feedback is triggered by the at least one first DL packet and a second set of the at least one first HARQ feedback is triggered by at least one third DL packet transmitted by the second BS. In both examples, the first BS detects the HARQ feedback(s) in the first resource region according to the DCI which indicates the DL packet(s) transmitted by the first BS. In addition, the first BS may forward the second set of the at least one first HARQ feedback to the second BS, after detecting the at least one first HARQ feedback, e.g., without decoding the second set of the at least one first HARQ feedback. In the second scenario (step 404) where the second resource region is used, the first BS forwards the HARQ feedback(s) to the second BS, if the HARQ feedback(s) is triggered by the DL packet(s) transmitted only by the second BS. It should be noted that the second scenario may be true, if one of the following situations happen. For example, the situation may happen, if the first BS does not transmit a packet to the communication device. In another example, the situation may happen, if the first BS transmits a packet to the communication device but the communication device does not receive (i.e., miss) the packet. In the above situations, the first BS receives the HARQ feedback(s) in the second resource region.

It is possible that the at least one first HARQ feedback in the process 40 is at least triggered by the at least one first DL packet and at least one third DL packet, wherein the at least one third DL packet is also transmitted by the first BS to the communication device, e.g., when the TDD is operated by the communication device. In this situation, the first scenario can be realized by that the first BS detects the at least one first HARQ feedback according to the DCI and second DCI, wherein the second DCI indicates the at least one third DL packet. Thus, the examples illustrated below can readily be extended to the case where the TDD is operated by the first BS, e.g., the TDD system.

Thus, the first BS can easily detect (e.g., recognize, receive, decode and/or demodulate) the HARQ feedback(s) transmitted by the communication device according to the resource regions where the HARQ feedback(s) locates. For example, in the first scenario (step 402), the first BS may detect (e.g., recognize, receive, decode and/or demodulate) the HARQ feedback(s) by itself, because the HARQ feedback(s) will locate in a first resource region according to the DCI. In the second scenario (step 404), the first BS may simply forward the HARQ feedback(s) to the second BS, because the HARQ feedback(s) will locate in a second resource region reserved for the second BS and the HARQ feedback(s) is not triggered by any packet transmitted by the first BS. The problem in the art that the first BS cannot provide the HARQ feedback (s) to the second BS correctly is solved. In addition, the problem that resource index which is used for determining resources for transmitting the HARQ feedback(s) cannot be synchronized between the first BS and the second BS is solved.

Realization of the present invention is not limited to the above description.

The at least one first HARQ feedback in the process 40 may be detected according to a function of a location of the DCI indicating the at least one first DL packet. For example, let $n_{DCI}$ be the location of the DCI. Considering that the first BS detects 4 HARQ feedbacks in the first resource region, wherein two of the HARQ feedbacks are triggered by DL packets transmitted by the first BS and the other HARQ feedbacks are triggered by DL packets transmitted by the second BS, the first BS may detect the HARQ feedbacks in PUCCH resources in the first resource region. The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)}=f(n_{DCI})$, $n_{PUCCH,1}^{(1)}=f(n_{DCI})+i$, $n_{PUCCH,2}^{(1)}=f(n_{DCI})+j$, $n_{PUCCH,3}^{(1)}=f(n_{DCI})+k$, $f(\cdot)$ is a function, and i, j, k may be predetermined values. For example, a PUCCH resource may be determined to the Table 10.1.2.2.1-5 of 3GPP TS 36.213 v11.3.0, for transmitting the at least one HARQ feedback. In other words, a method for determining $n_{PUCCH,x}^{(1)}$ is provided in the present invention, and can be applied to the case of the PUCCH format 1b with channel selection. The above example can be applied to the first BS operating the TDD or the FDD.

Similarly, another example for the first BS operating the TDD is illustrated as follows. Let $n_{DCI,0}$ and $n_{DCI,1}$ be the locations of first DCI and second DCI, respectively, which both indicate DL packets transmitted by the first BS. Considering that the first BS detects 4 HARQ feedbacks in the first resource region, wherein two of the HARQ feedbacks are triggered by DL packets transmitted by the first BS and the other HARQ feedbacks are triggered by DL packets transmitted by the second BS, the first BS may detect the HARQ feedbacks in PUCCH resources. The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)}=f(n_{DCI,0})$, $n_{PUCCH,1}^{(1)}=f(n_{DCI,0})+i$, $n_{PUCCH,2}^{(1)}=f(n_{DCI,1})$, $n_{PUCCH,3}^{(1)}=f(n_{DCI,1})+i$, $f(\cdot)$ is a function, and i may be a predetermined value.

The at least one first HARQ feedback in the process 40 may be detected according to an indication in the DCI and a function of a location of the DCI indicating the at least one first DL packet. For example, let $n_{DCI}$ be the location of the DCI. Considering that the first BS detects 4 HARQ feedbacks in the first resource region, wherein two of the HARQ feedbacks are triggered by DL packets transmitted by the first BS and the other HARQ feedbacks are triggered by DL packets transmitted by the second BS, the first BS may detect the HARQ feedbacks in PUCCH resources in the first resource region. The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)}=f(n_{DCI})$, $n_{PUCCH,1}^{(1)}=f(n_{DCI})+i$, $f(\cdot)$ is a function, and i may be a predetermined value. $n_{PUCCH,2}^{(1)}$ and $n_{PUCCH,3}^{(1)}$ are determined according to the indication in the first DCI. In another example, $n_{PUCCH,0}^{(1)}$, $n_{PUCCH,1}^{(1)}$, $n_{PUCCH,2}^{(1)}$ and $n_{PUCCH,3}^{(1)}$ are determined according to the indication in the first DCI. Preferably, the indication may be in a TPC field of the DCI, and is not limited herein. The above example can be applied to the first BS operating the TDD or the FDD.

Another example for the first BS operating the TDD is illustrated as follows. Let $n_{DCI,0}$ and $n_{DCI,1}$ be the locations of first DCI and second DCI, respectively, which both indicate DL packets transmitted by the first BS. Considering that the first BS detects 4 HARQ feedbacks in the first resource region, wherein two of the HARQ feedbacks are triggered by DL packets transmitted by the first BS and the other HARQ feedbacks are triggered by DL packets transmitted by the second BS, the first BS may detect the HARQ feedbacks in PUCCH resources. The PUCCH resources may be determined according to $n_{PUCCH,0}^{(1)}$, $n_{PUCCH,1}^{(1)}$, $n_{PUCCH,2}^{(1)}$ and $n_{PUCCH,3}^{(1)}$, wherein $n_{PUCCH,0}^{(1)}=f(n_{DCI,0})$, $n_{PUCCH,1}^{(1)}=f(n_{DCI,0})+i$, $f(\cdot)$ is a function, and i may be a predetermined value. $n_{PUCCH,2}^{(1)}$ and $n_{PUCCH,3}^{(1)}$ may be determined according to an indication in the second DCI.

On the other hand, in the first scenario (step 402) where the first resource region is used, the first BS may detect the at least one first HARQ feedback by detecting a first bit representing a first set of the at least one first HARQ feedback and a second bit representing a second set of the at least one first HARQ feedback. The first set of the at least one first HARQ feedback is triggered by the at least one first DL packet, and the second set of the at least one first HARQ feedback is triggered by at least one third DL packet transmitted by the second BS. In other words, the HARQ feedbacks to be detected are compressed, and are represented by only two bits, to reduce the overhead. For example, the first bit may be "1" with PUCCH format 1b (or PUCCH format 3) if all the at least one first DL packet is correctly received by the communication device (e.g., logical "AND" is used); otherwise, the first bit may be "0". Similarly, the second bit may be "1" with PUCCH format 1b (or PUCCH format 3) if all the at least one third DL packet is correctly received by the communication device (e.g., logical "AND" is used); otherwise, the second bit may be "0".

On the other hand, in the second scenario (step 404) where the second resource region is used, the first BS may forward the at least one second HARQ feedback by forwarding a bit representing the at least one second HARQ feedback. In other words, the HARQ feedbacks to be forwarded are compressed, and are represented by only one bit, to reduce the overhead. For example, the bit may be "1" with PUCCH format 1a (or PUCCH format 3) if all the at least one second DL packet is correctly received by the communication device (e.g., logical "AND" is used); otherwise, the bit may be "0".

Figure 5:
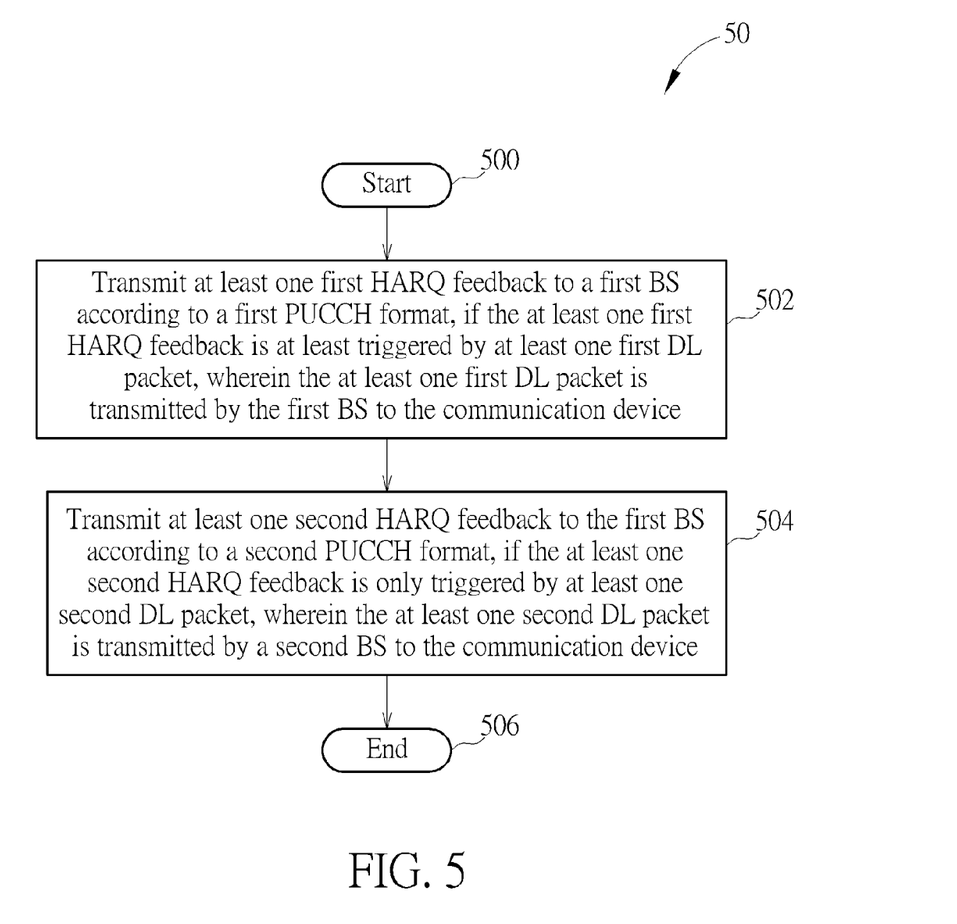
FIG. 5 is a flowchart of a process according to an example of the present invention.

FIG. 5 is a flowchart of a process 50 according to an example of the present invention. The process 50 may be utilized in a communication device, for transmitting HARQ feedbacks. The process 50 may be compiled into the program code 214 and includes the following steps:

Step 500: Start.

Step 502: Transmit at least one first HARQ feedback to a first BS according to a first PUCCH format, if the at least one first HARQ feedback is at least triggered by at least one first DL packet, wherein the at least one first DL packet is transmitted by the first BS to the communication device.

Step 504: Transmit at least one second HARQ feedback to the first BS according to a second PUCCH format, if the at least one second HARQ feedback is only triggered by at least one second DL packet, wherein the at least one second DL packet is transmitted by a second BS to the communication device.

Step 506: End.

According to the process 50, the communication device (e.g., the UE 100) transmits at least one first HARQ feedback to a first BS (e.g., the BS 102) according to a first PUCCH format, if the at least one first HARQ feedback is at least triggered by at least one first DL packet, wherein the at least one first DL packet is transmitted by the first BS to the communication device. In addition, the communication device transmits at least one second HARQ feedback to the first BS according to a second PUCCH format, if the at least one second HARQ feedback is only triggered by at least one second DL packet, wherein the at least one second DL packet is transmitted by a second BS (e.g., the BS 104) to the communication device.

In other words, an example of the first scenario (step 502) may be that the at least one first HARQ feedback is triggered only by the at least one first DL packet. Another example of the first scenario may be that a first set of the at least one first HARQ feedback is triggered by the at least one first DL packet and a second set of the at least one first HARQ feedback is triggered by at least one third DL packet transmitted by the second BS. In both examples, the communication device transmits the HARQ feedback (s) according to the first PUCCH format. In the second scenario (step 504), the communication device transmits the HARQ feedback (s) in the second resource region according to the second PUCCH format, if the HARQ feedback (s) is triggered by the DL packet (s) transmitted only by the second BS.

In one example, the process 50 may be realized according to that the communication device transmits the at least one first HARQ feedback (e.g., in a PUCCH format 3 resource region) to the first BS according to a PUCCH format 3, if the at least one first HARQ feedback is at least triggered by the at least one first DL packet. In addition, the communication device transmits the at least one second HARQ feedback (e.g., in a PUCCH format 1 resource region) to the first BS according to a PUCCH format 1a/1b, if the at least one second HARQ feedback is only triggered by the at least one second DL packet.

In another example, the process 50 may be realized according to that the communication device transmits the at least one first HARQ feedback (e.g., in a first partition of a PUCCH format 3 resource region which may not be known by the communication device) to the first BS according to a PUCCH format 3, if the at least one first HARQ feedback is at least triggered by the at least one first DL packet. In addition, the communication device transmits the at least one second HARQ feedback (e.g., in a second partition of the PUCCH format 3 resource region which may not be known by the communication device) to the first BS according to the PUCCH format 3, if the at least one second HARQ feedback is only triggered by the at least one second DL packet.

The communication device may transmit the at least one first HARQ feedback in the process 50 by transmitting the at least one first HARQ feedback in a PUCCH resource (e.g., of the first resource region which may not be known by the communication device) to the first BS, wherein the PUCCH resource is determined according to a physical signaling (e.g., ACK resource offset (ARO), a new field in a corresponding PDCCH/enhanced PDCCH (ePDCCH), etc.), a higher layer signaling (e.g., medium access control (MAC) signaling, radio resource control (RRC) signaling, etc.) or a predetermined resource (e.g., the first PUCCH resource). In addition, the TPC field may be used, if the at least one first DL packet includes a single physical DL shared channel (PDSCH). Preferably, the corresponding PDCCH/ePDCCH should satisfy $DAI_{DL}>1$, if the at least one first DL packet includes multiple PDSCHs, e.g., time-division duplexing (TDD) is operated by the communication device. Note that $DAI_{DL}$ is DL assignment index of a corresponding DCI for DL assignment.

Similarly, the communication device may transmit the at least one second HARQ feedback in the process 50 by transmitting the at least one second HARQ feedback in a PUCCH resource (e.g., of the first resource region which may not be known by the communication device) to the first BS, wherein the PUCCH resource is determined according to a physical signaling (e.g., ARO, a new field in a corresponding PDCCH/ePDCCH, etc.), a higher layer signaling (e.g., MAC signaling, RRC signaling, etc.) or a predetermined resource (e.g., the first PUCCH resource).

Thus, the first BS can easily detect (e.g., recognize, receive, decode and/or demodulate) the HARQ feedback (s) transmitted by the communication device according to resource regions where the HARQ feedback (s) locates. For example, in the first scenario (step 502), the first BS may detect the HARQ feedback (s) by itself, because the HARQ feedback (s) will locate in a first resource region. In the second scenario (step 504), the first BS may simply forward the HARQ feedback (s) to the second BS, because the HARQ feedback (s) will locate in a second resource region reserved for the second BS and the HARQ feedback (s) is not triggered by any packet transmitted by the first BS. It should be noted that the communication device may not know the existence of the resource regions which are preferably used (e.g., scheduled) by the first BS. The problem in the art that the first BS cannot provide the HARQ feedback (s) to the second BS immediately is solved. In addition, the problem that resource index which is used for determining resources for transmitting the HARQ feedback (s) cannot be synchronized between the first BS and the second BS is solved.

It should be noted that a HARQ resource mentioned above is not limited to a bit, a resource element (RE), a resource block (RB) or a resource block group (RBG), but can be referred to one or more bits, REs, RBs or RBGs, and is not limited herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling HARQ feedbacks. The problem in the art that a BS cannot handle the HARQ feedback (s) for multiple BSs, e.g., provides the HARQ feedback (s) to another BS immediately, is solved. Thus, the BSs and the communication device can operate regularly without being affected by the missed or delayed HARQ feedback(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting hybrid automatic repeat request (HARQ) feedbacks for a communication device, the method comprising:
    transmitting at least one first HARQ feedback to a first base station according to first downlink (DL) control information (DCI) indicating at least one first DL packet, if the at least one first HARQ feedback is at least triggered by the at least one first DL packet, wherein the at least one first DL packet is transmitted by the first base station to the communication device; and
    transmitting at least one second HARQ feedback to the first base station, if the at least one second HARQ feedback is only triggered by at least one second DL packet, wherein the at least one second DL packet is transmitted by a second base station to the communication device.

2. The method of claim 1, wherein the at least one first HARQ feedback is transmitted to the first base station according to a function of a location of the first DCI indicating the at least one first DL packet.

3. The method of claim 1, wherein the at least one first HARQ feedback is transmitted to the first base station according to an indication in the first DCI and a function of a location of the first DCI indicating the at least one first DL packet.

4. The method of claim 3, wherein the indication is in a transmit power control (TPC) field of the first DCI.

5. The method of claim 1, wherein the at least one second HARQ feedback is transmitted to the first base station according to second DCI indicating the at least one second DL packet.

6. The method of claim 1, wherein the at least one second HARQ feedback is transmitted to the first base station according to a higher layer configuration.

7. The method of claim 1, wherein the communication device is configured to transmit the at least one first HARQ feedback and the at least one second HARQ feedback according to a physical uplink (UL) control channel (PUCCH) format 1a or 1b.

8. The method of claim 1, wherein a primary cell of the communication device is controlled by the first base station.

9. The method of claim 1, wherein the at least one first HARQ feedback is at least triggered by the at least one first DL packet, if the at least one first HARQ feedback is triggered only by the at least one first DL packet.

10. The method of claim 1, wherein the at least one first HARQ feedback is at least triggered by the at least one first DL packet, if a first set of the at least one first HARQ feedback is triggered by the at least one first DL packet and a second set of the at least one first HARQ feedback is triggered by at least one third DL packet transmitted by the second base station.

11. The method of claim 10, wherein the communication device transmits the at least one first HARQ feedback by transmitting a first bit representing the first set of the at least one first HARQ feedback and a second bit representing the second set of the at least one first HARQ feedback.

12. The method of claim 1, wherein the communication device transmits the at least one second HARQ feedback by transmitting a bit representing the at least one second HARQ feedback.

13. The method of claim 1, wherein the communication device transmits the at least one first HARQ feedback according to the first DCI and second DCI indicating at least one third DL packet, if the at least one first HARQ feedback is at least triggered by the at least one first DL packet and the at least one third DL packet, wherein the at least one third DL packet is transmitted by the first base station to the communication device.

14. A method of transmitting hybrid automatic repeat request (HARQ) feedbacks for a communication device, the method comprising:
    transmitting at least one first HARQ feedback to a first base station according to a first physical uplink (UL) control channel (PUCCH) format, if the at least one first HARQ feedback is at least triggered by at least one first downlink (DL) packet, wherein the at least one first DL packet is transmitted by the first base station to the communication device; and
    transmitting at least one second HARQ feedback to the first base station according to a second PUCCH format, if the at least one second HARQ feedback is only triggered by at least one second DL packet, wherein the at least one second DL packet is transmitted by a second base station to the communication device.

15. The method of claim 14, wherein the first PUCCH format is a PUCCH format 3, and the second PUCCH format is a PUCCH format 1a/1b.

16. The method of claim 14, wherein the first PUCCH format is a PUCCH format 3, and the second PUCCH format is the PUCCH format 3.

17. The method of claim 14, wherein the at least one first HARQ feedback is transmitted in a first PUCCH resource to the first base station according to the first PUCCH format, the at least one second HARQ feedback is transmitted in a second PUCCH resource to the first base station according to the second PUCCH format, and the first PUCCH resource and the second PUCCH resource are respectively determined according to physical signalings, higher layer signalings or predetermined resources.

18. The method of claim 14, wherein the at least one first HARQ feedback is at least triggered by the at least one first DL packet, if the at least one first HARQ feedback is triggered only by the at least one first DL packet.

19. The method of claim 14, wherein the at least one first HARQ feedback is at least triggered by the at least one first DL packet, if a first set of the at least one first HARQ feedback is triggered by the at least one first DL packet and a second set of the at least one first HARQ feedback is triggered by at least one third DL packet transmitted by the second base station.

* * * * *